(12) United States Patent
Sevrey et al.

(10) Patent No.: US 11,744,170 B2
(45) Date of Patent: Sep. 5, 2023

(54) HANDHELD SPREADER WITH REMOVABLE SIFTER

(71) Applicant: Earthway Products Inc, Bristol, IN (US)

(72) Inventors: Richard Sevrey, Bristol, IN (US); Joey Arthur, Mishawaka, IN (US); Tim Jones, Osceola, IN (US); John Marshall, Granger, IN (US); Casey Martin, South Bend, IN (US); Joe Jimenez, Elkhart, IN (US)

(73) Assignee: Earthway Products Inc, Bristol, IN (US)

( * ) Notice: Subject to any disclaimer, the term of this patent is extended or adjusted under 35 U.S.C. 154(b) by 278 days.

(21) Appl. No.: 16/886,266

(22) Filed: May 28, 2020

(65) Prior Publication Data

US 2021/0368671 A1 Dec. 2, 2021

(51) Int. Cl.
*A01C 15/02* (2006.01)
*E01H 10/00* (2006.01)

(52) U.S. Cl.
CPC ............ *A01C 15/02* (2013.01); *E01H 10/00* (2013.01)

(58) Field of Classification Search
CPC .............................. A01C 15/02; B65D 47/046
USPC .................. 239/657, 652; 222/480, 548, 565
See application file for complete search history.

(56) References Cited

U.S. PATENT DOCUMENTS

| 2,971,681 | A | * | 2/1961 | Galbierz | ............... | B65D 39/04 |
| | | | | | | 222/548 |
| 3,471,054 | A | * | 10/1969 | Ostrowsky | .............. | A47J 36/10 |
| | | | | | | 220/318 |
| 3,769,899 | A | * | 11/1973 | Kostko | .................. | A47J 39/00 |
| | | | | | | D7/354 |

(Continued)

FOREIGN PATENT DOCUMENTS

WO WO-2013091680 A1 * 6/2013 ............. A01C 15/02

OTHER PUBLICATIONS

Patio Eden Hand Held Fertilizer and Seed Spreader—80 Ounce—Perfect for Seed, Fertilizer, Ice Melt, Salt. Multiple Opening Sizes, https://www.amazon.com/dp/B07PQK3WT4?tag=theouterdoorseoe-20&linkCode=ogi&th=1 &psc=1?tag=theouterdoorseoe-20, 8 pages.

(Continued)

*Primary Examiner* — Jason J Boeckmann
(74) *Attorney, Agent, or Firm* — Hovey Williams LLP; Kameron D. Kelly (57) ABSTRACT

Handheld spreaders and methods of operating the same. The spreader can include a cup to hold particulate material and having an open upper end, a scoop assembly provided proximate the open upper end of the cup and including a scoop for directing particulate material being dispersed from the cup, and a sifter assembly removably coupled to the scoop assembly for metering an amount of the particulate material being dispersed from the cup. When the sifter assembly is removed from the scoop assembly, the scoop remains attached to the cup to direct particulate material being provided into the cup via the open upper end. The method can include opening the cup by removing the sifter assembly from the scoop assembly, placing particulate material into an open interior of the cup, closing the cup by (Continued)

replacing the sifter assembly, and dispersing the particulate material through the sifter assembly.

14 Claims, 9 Drawing Sheets

(56) References Cited

U.S. PATENT DOCUMENTS

| | | | |
|---|---|---|---|
| 3,829,026 A * | 8/1974 | Aghnides | E03C 1/084 239/394 |
| 4,120,432 A * | 10/1978 | Fuchs | B65D 83/06 222/565 |
| 6,450,361 B1 * | 9/2002 | Mendelson | A47J 27/0811 220/573.1 |
| 6,561,437 B1 | 5/2003 | Schulman | |
| 7,690,440 B2 | 4/2010 | Dean et al. | |
| 8,297,535 B1 | 10/2012 | Reid | |
| 9,139,963 B2 | 9/2015 | Zwahlen et al. | |
| 9,289,800 B1 | 3/2016 | Rosado | |
| 9,724,629 B2 | 8/2017 | Lane | |
| 10,234,318 B2 | 3/2019 | Pater et al. | |
| 10,494,173 B2 | 12/2019 | Sheppard et al. | |
| 2007/0000954 A1 | 1/2007 | Hill | |
| 2009/0057332 A1 | 3/2009 | Arzola | |
| 2009/0072055 A1 * | 3/2009 | Flanagan-Kent | A01C 15/02 222/533 |
| 2013/0026189 A1 | 1/2013 | Knapp | |
| 2013/0284831 A1 | 10/2013 | Darnell | |
| 2015/0251148 A1 | 9/2015 | Norman et al. | |
| 2017/0050763 A1 | 2/2017 | Gharibjanians et al. | |
| 2020/0120861 A1 | 4/2020 | Rich | |

OTHER PUBLICATIONS

Adjustable Fertilizer and Seed Spreader, https://www.wayfair.com/Zenport-Adjustable-Fertilizer-and-Seed-Spreader-S205-L897-K~YRXD1041.html?refid=GX99081509962-YRXD1041&device=c&ptid=761838524042&network=g&targetid=pla-761838524042&channel=GooglePLA&ireid=69290742&fdid=1817&gclid=EAIaIQobChMI4fGtm_bH6AIVFKSzCh2ORAq_EAkYASABEgJna_D_BwE, 16 pages.

* cited by examiner

HANDHELD SPREADER WITH REMOVABLE SIFTER

TECHNICAL FIELD

The present invention relates to a particulate dispersing apparatus and, more specifically, to a handheld scoop spreader with a removable sifter.

BACKGROUND OF THE INVENTION

Many different types of spreaders and scoops are used to distribute particulate material or granules such as fertilizer, grass seed, salt, sand, ice melt, and others to lawns, golf courses, turf, sidewalks, parking lots, and various other surfaces. Handheld spreaders are useful for small applications, tight spaces, or hilly terrain where a rolling spreader would be impractical or undesirable. Handheld spreaders generally include broadcast spreaders and containers with holes in the top like a saltshaker. Broadcast spreaders generally include a hopper disposed above a rotating impeller, one or more openings within the bottom of the hopper, and a shut-off plate below the one or more openings that selectively opens and closes the exit openings in the bottom of the hopper thereby permitting or restricting granules from falling on the impeller, which in turn flings and thus distributes granules on the area being treated. Shaker-type spreaders generally include small holes or screen disposed at the open end of a container or cup housing particulate material, and a user inverts the spreader and shakes or other agitates the spreader causing the particulate material to flow through the open end and the sifter and thus onto a surface being treated.

Shaker-type handheld spreaders are often difficult to refill because the sifter, by design, blocks the open end of the cup and putting particulate into the container is difficult. Thus, often these spreaders are provided for single use applications. That is, the spreader is sold preloaded with a certain product and once exhausted the user will dispose of the spreader. For reusable shaker-type handheld spreaders, the entire shaker assembly must be removed from the open end of the cup or container by, for example, unthreading the cap assembly from the open end thereby exposing the open end. Doing so removes any attendant features of the sifter assembly such as scoops or the like. Thus, the scoop and other features cannot be used during filling of the container, and similarly the scoop cannot be used without the sifter in place.

There thus remains a need for a shaker-type handheld spreader that is easily refillable. There further remains a need for a shaker-type handheld spreader that includes features such as a scoop or similar that can be used with or without a sifter assembly in place.

BRIEF SUMMARY OF THE INVENTION

The instant invention is generally directed to a handheld spreader with a removable sifter that overcomes the deficiencies of the handheld spreaders discussed above.

More particularly, some embodiments of the instant invention are directed to a handheld spreader that includes a cup to hold particulate material to be spread about a surface and having an open upper end for dispersing the particulate material, a scoop assembly provided proximate the open upper end of the cup and including a scoop for directing particulate material being dispersed from the cup, and a sifter assembly removably coupled to the scoop assembly for metering an amount of the particulate material being dispersed from the cup. When the sifter assembly is removed from the scoop assembly, the scoop remains attached to the cup to direct particulate material being provided into the cup via the open upper end.

Other embodiments of the invention are directed to a dual configuration handheld spreader. The dual configuration handheld spreader includes a cup for holding particulate material to be spread about a surface and including an open upper end for dispersing the particulate material, a scoop assembly provided proximate the open upper end of the cup and including a scoop, and a sifter assembly. When the handheld spreader is in a first configuration, the sifter assembly is coupled to the scoop assembly and meters an amount of the particulate material being dispersed from the cup, and the scoop directs particulate material being dispersed from the cup. When the handheld spreader is in a second configuration, the sifter assembly is removed from the scoop assembly and the scoop directs particulate material into the cup.

Still other embodiments of the invention are directed to a method of operating a handheld spreader. The method includes opening a cup of a handheld spreader, such as one of the handheld spreaders described above, by removing the sifter assembly from the scoop assembly. The method further includes placing particulate material into an open interior of the cup and closing the cup by replacing the sifter assembly onto the scoop assembly. Finally, the method includes dispersing the particulate material by inverting the handheld spreader to cause the particulate material to flow through the sifter assembly and onto the scoop.

These and other features will be discussed in more detail in connection with the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

At a high level, the subject matter of this application generally relates to handheld spreaders used to distribute granules such as fertilizer, grass seed, and other grass treatments on lawns, golf courses, and other turf, or used to distribute granules such as salt, sand, ice melt, and others on a variety of surfaces. The spreader includes a scoop and sifter assembly provided at an open upper end of a cup that holds the particulate to be distributed. The sifter assembly is removable from the cup and the scoop assembly for ease of filling the cup and so that the spreader with scoop assembly attached can be used apart from the sifter assembly. These features will become more readily apparent in the following discussion.

Figure 1:
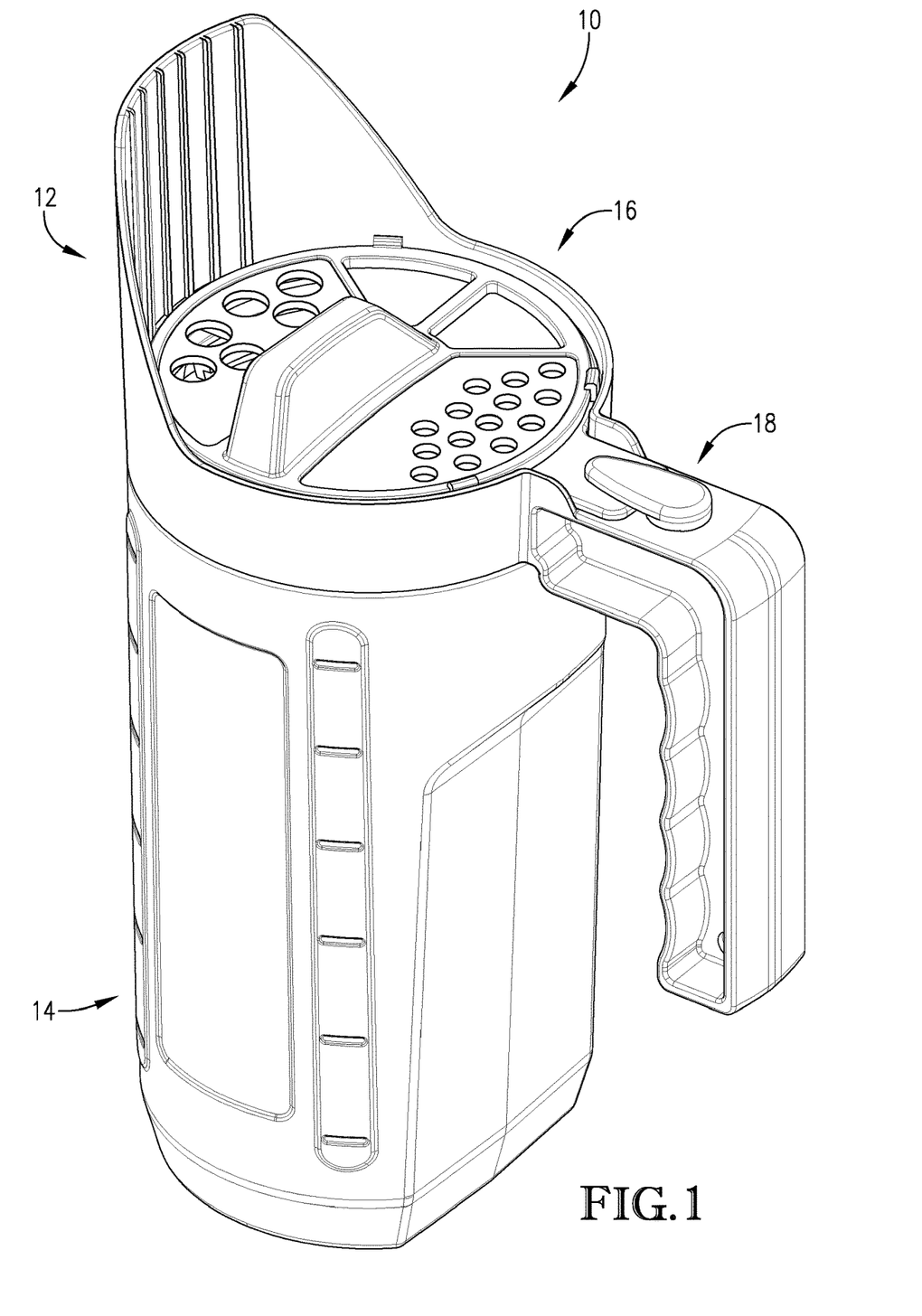
FIG. 1 is a perspective view of a handheld spreader according to aspects of the invention.
Figure 2:
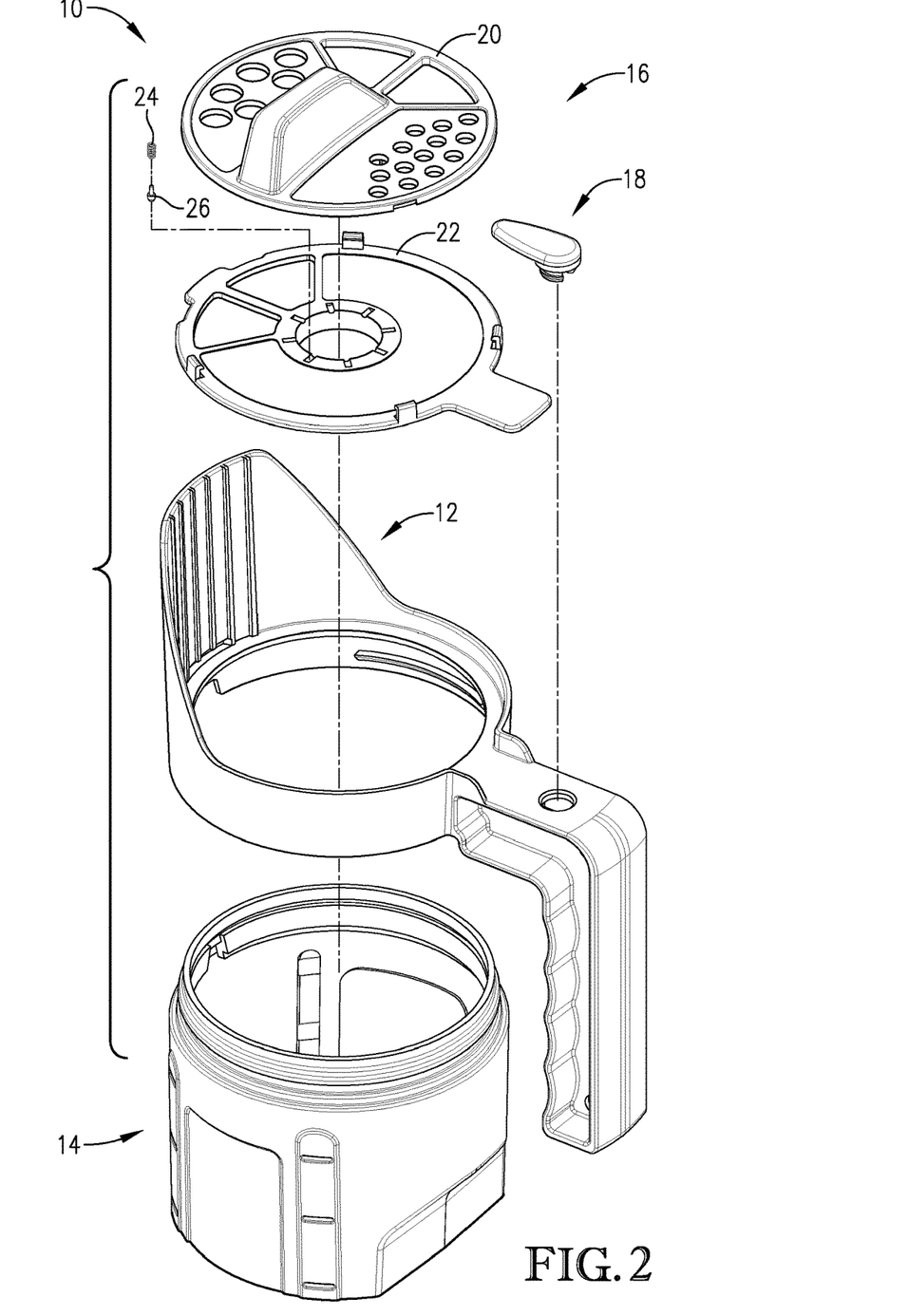
FIG. 2 is a partial exploded view of the handheld spreader shown in FIG. 1.

FIGS. 1 and 2 show a handheld spreader 10 according to an embodiment of the invention. The handheld spreader 10 includes a generally cylindrical and hollow cup 14 with an open upper end 30 (FIG. 3) configured to house granules or other particulate material to be spread about a surface. A scoop assembly 12 and sifter assembly 16 are disposed at the open upper end 30, with the sifter assembly 16 being affixed to the scoop assembly 12 in part by a sifter latch 18. As will be discussed in more detail below in connection with FIGS. 6-9, the sifter assembly 16 generally includes a stationary (i.e., non-pivotable with respect to the cup 14 when in the installed position shown in FIG. 1) retainer disk 22, and a movable (i.e., pivotable or rotatable with respect to the cup 14 when in the installed position shown in FIG. 1) selection disk 20. The sifter assembly 16 may also include a spring 24 and pin 26 sandwiched between the selection disk 20 and retainer disk 22, which lock the selection disk 20 in one of a predetermined number of rotational positions via a plurality of receiving notches 66 in retainer disk 22. More particularly, the selection disk 20 is configured to pivot or rotate with respect to the retainer disk 22 and lock into a predetermined number of rotational positions (e.g., eight positions in the depicted embodiment). In this regard, various openings on the selection disk 20 are configured to align with openings provided in retainer disk 22 thereby permitting a metered flow therethrough, as will be discussed in more detail below.

Figure 3:
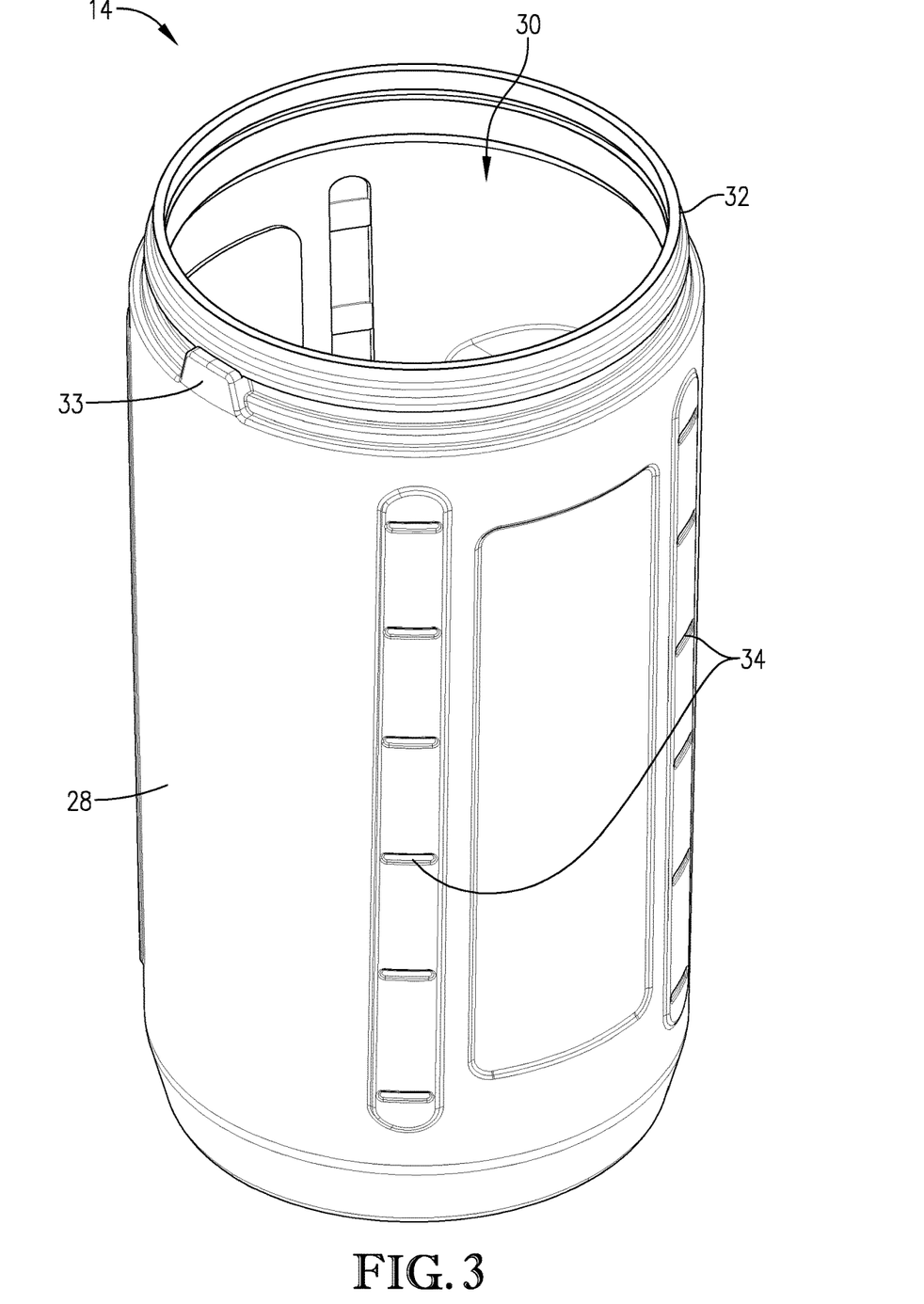
FIG. 3 is a perspective view of a cup of the handheld spreader shown in FIGS. 1-2.
Figure 13:
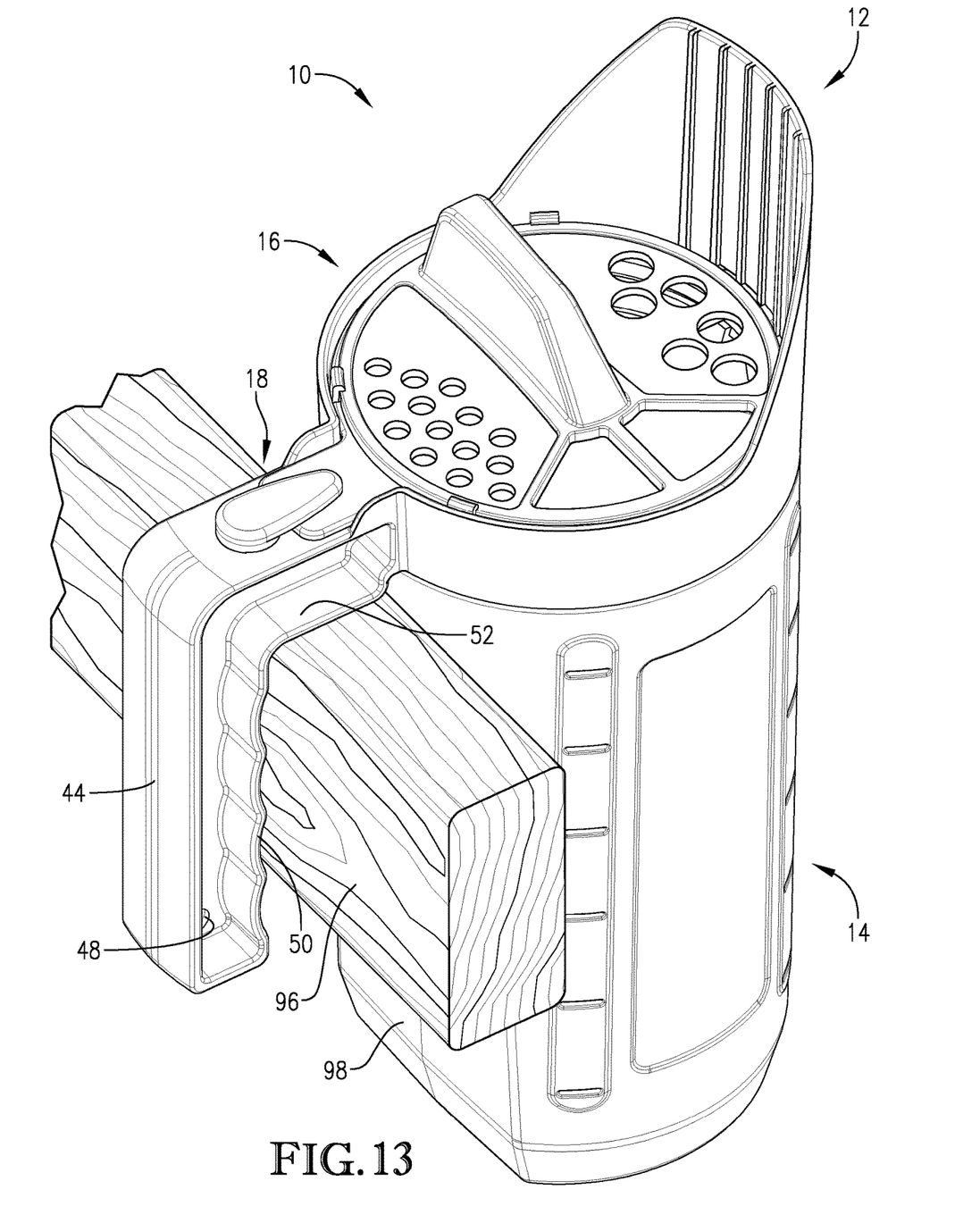
FIG. 13 is a perspective view of the handheld spreader shown in FIGS. 1-2 supported on a board.

Turning now to FIGS. 3-11, the various component parts of the handheld spreader 10 will be discussed in more detail. First, FIG. 3 shows the cup 14 of the handheld spreader 10. Again, in the depicted embodiment the cup 14 is generally cylindrical except for certain surface indentations such as the plurality of tick marks 34 and a generally flattened or truncated portion 98 (FIG. 13). The cup 14 defines a hollow interior configured to hold granules or other particulate material to be spread about a surface, and an open upper end 30 into which the granules or other particulate material are loaded into the cup 14 and dispersed therefrom. In some embodiments, each of the plurality of tick marks 34 corresponds to the upper limits of a predetermined interior volume so that a user can determine how much particulate material is within the cup 14 and/or how much particulate material has been dispensed therefrom. Finally, in some embodiments the cup 14 includes a threaded lip 32 or other coupler surrounding the open upper end 30 configured to receive the scoop assembly 12, as will be discussed. In some embodiments, the threaded lip 32 includes an alignment tab 33, which will be discussed in more detail in connection with the discussion of the correspondingly shaped alignment notch 54 provided in the scoop assembly 12 below.

Figure 4:
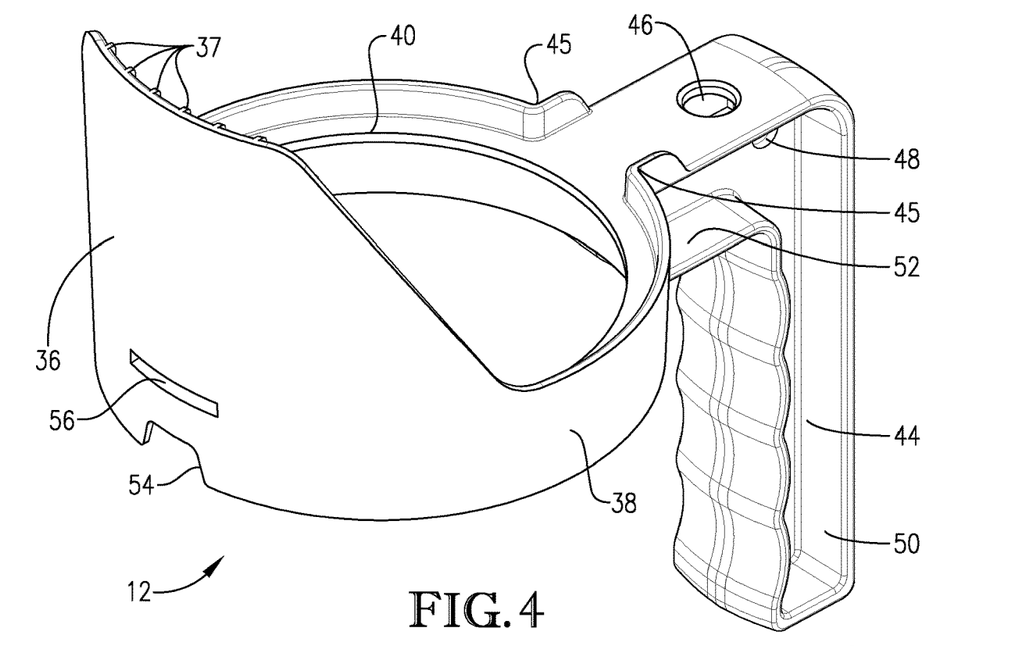
FIG. 4 is a top perspective view of a scoop assembly of the handheld spreader shown in FIGS. 1-2.
Figure 5:
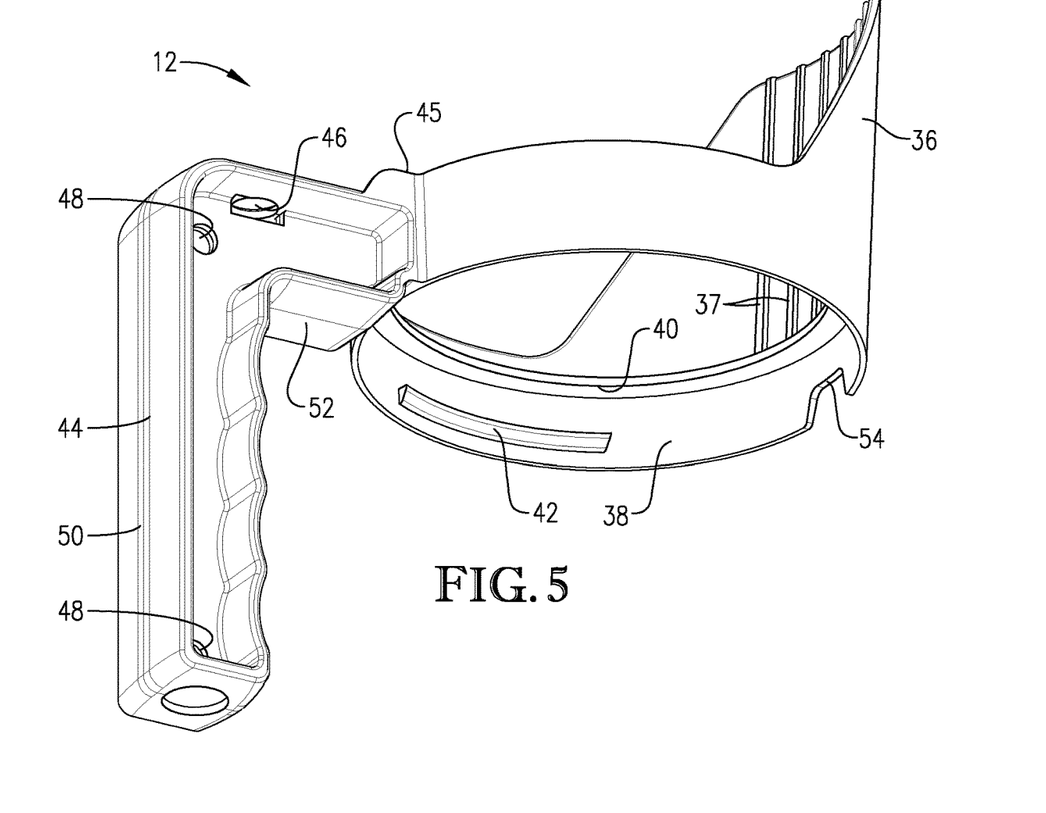
FIG. 5 is a bottom perspective view of the scoop assembly shown in FIG. 4.

FIGS. 4 and 5 show the scoop assembly 12, which is removably received on the cup 14 and, more particularly, on the threaded lip 32 of the cup 14. At a high level, the scoop assembly 12 serves at least three distinct functions: it includes a handle 44 for a user to grasp when using the handheld spreader 10 and/or for storage of the handheld spreader (FIG. 13). It includes a scoop 36 for scooping granules or other particulate material into the handheld spreader 10 and/or to direct the spreading of granules or other particulate material leaving the handheld spreader 10. And it provides a seat (i.e., ring portion 38) for removably connecting the scoop assembly 12 to the cup 14 and for removably receiving the sifter assembly 16.

The ring portion 38 is generally sized and shaped to surround the threaded lip 32 of the cup 14. In some embodiments the ring portion 38 may include one or more bosses 42 extending inward (i.e., towards the open interior of the handheld spreader 10) from an interior facing surface of the ring portion 38. The bosses 42 are sized and shaped to interact with the threaded lip 32 of the cup 12 in order to thread the scoop assembly 12 onto and off of the cup 14 in a conventional manner. The ring portion 38 may also include an annular lip 40 extending inward from the interior facing surface, which is configured to abut, and in some instances contact, an upper edge of the cup 14 when the scoop assembly 12 is fully seated.

Extending from the rear portion of the ring portion 38 is an L-shaped handle 44. The handle 44 includes a generally horizontally extending hook portion 52 and a generally vertically extending hand portion 50. In some embodiments, the hand portion 50 includes a number of finger depressions configured to receive the fingers of a user's hand as well as one or more through holes 48. As will be discussed more fully below in connection with FIG. 13, the through holes 48 can receive a hook of a tie-down or the like for securing the spreader 10 to a board 96 or other support structure. The hook portion 52 of the handle 44 is sized and shaped to engage the board 96 or other support structure, which will also be discussed more fully below. The hook portion 52 also includes a latch seat 46 on an upper surface of the hook portion 52. The latch seat 46 is a through hole sized and shaped to receive a plurality of protrusions 94 (FIGS. 10 and 11) of the sifter latch 18 in a friction fit, which will be discussed more fully below.

At a front of the ring portion 38 (that is, a portion of the ring portion 38 provided opposite to the handle 44) the scoop assembly 12 includes a scoop 36, a sifter seat 56, and an alignment notch 54. As discussed, the alignment notch 54 has a corresponding shape as the alignment tab 33 provided at the threaded lip 32 of the cup 14. During assembly, the scoop assembly 12 is threaded onto the cup 12 via the one or more bosses 42 engaging the threaded lip 32 of the cup 14. The scoop assembly 12 is spun, and thus threaded, about the threaded lip 32 of the cup 14 until the lip 40 abuts the upper end of the cup 14. At this position, the alignment notch 54 will receive the alignment tab 33, thereby securing the scoop assembly 12 in the installed position (i.e., the position shown in FIGS. 1, 12, and 13). This locks the scoop assembly 12 in place on the cup 14 and prevents inadvertent loosening and/or removal of the scoop assembly 12 during use of the handheld spreader 10. More particularly, in order to remove the scoop assembly 12 from the fully installed position, enough force must be applied to the scoop assembly 12 to first dislodge the alignment tab 33 from the alignment notch 54. This prevents the scoop assembly 12 from working free or otherwise separating from the cup 14 during use of the spreader 10 while still permitting removal when it is desirable to do so.

Figure 12:
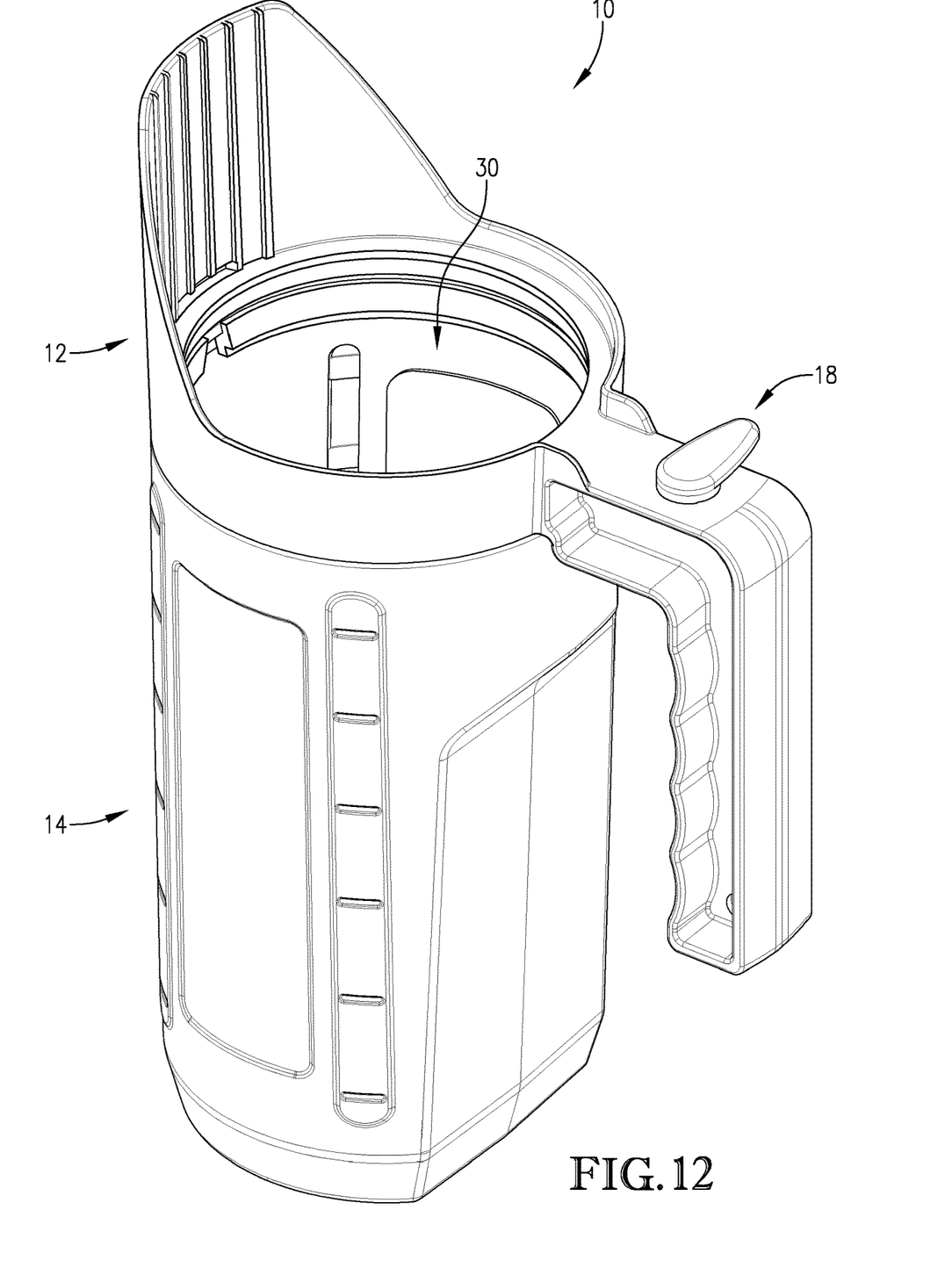
FIG. 12 is a perspective view of the handheld spreader shown in FIGS. 1-2 with a sifter assembly removed.

The scoop 36 extends upward (i.e., away from the cup 14) near a front of the ring portion 38. The scoop 36 is generally arcuate in cross-section and may include a series of serrations 37 on an inwardly facing surface thereof. The serrations 37 may serve to guide and thus direct granules or other particulate material leaving the spreader and thus sliding down the scoop during use. Moreover, when used without the sifter assembly 16 in place as is shown in FIG. 12 (i.e., when filling the cup 14 with granules or other particulate material) the serrations may assist breaking up granules or other particulate material. As one example, often salt or other ice melt clumps together. When scooping the salt or ice melt using the scoop 36, the serrated upper edge thereof formed by the serrations 37 may assist to break up any clumps that are present and thus more granular, flowable pieces into the interior of the cup 14. Finally, the scoop assembly 12 includes a sifter seat 56 at a front portion of the scoop assembly 12 proximate to and above the alignment notch 54. The sifter seat 56 may be a through hole or slot in the scoop 36 and/or ring portion 38 for receiving a corresponding shaped and sized tab 70 of the sifter assembly 16, which will be discussed in more detail below.

Figure 6:
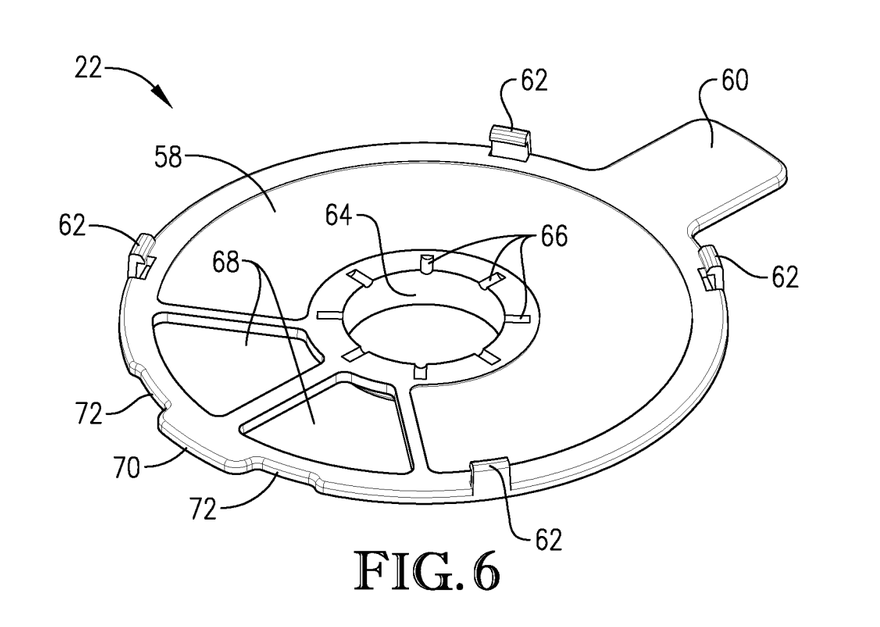
FIG. 6 is a top perspective view of a retainer disk of the handheld spreader shown in FIGS. 1-2.
Figure 7:
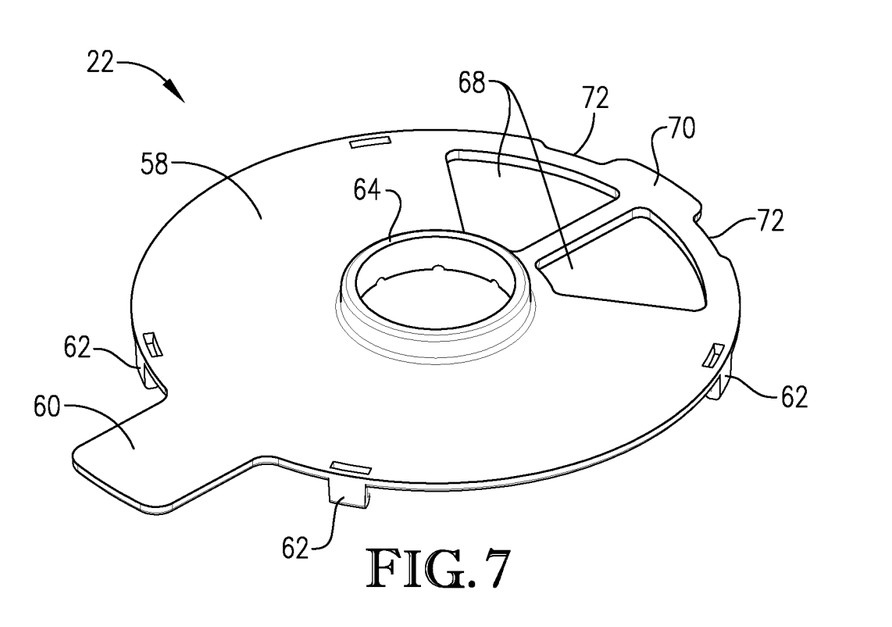
FIG. 7 is a bottom perspective view of the retainer disk shown in FIG. 6.

Turning now to FIGS. 6-9, the retainer disk 22 and selection disk 20 of the sifter assembly 16 will be discussed in more detail. First, as shown in FIGS. 6 and 7, the retainer disk 22 includes a main body 58 having a substantially circular outer perimeter but for a tab 60 provided at a rear side of the disk 22 and an extension 70 flanked by two depressions 72 provided at a front side of the disk. The tab 60 generally aligns with the handle 44 when the retainer disk 22 is assembled to the handheld spreader 10 and more particularly the tab 60 is aligned with the hook portion 52 of the handle 44 when the disk 22 is in the assembled position. In that regard, in some embodiments the handle 44 will include a pair of upstanding ears 45 that extend rearward from the ring portion 38 and sandwich the tab 60 therebetween, aligning the tab 60 with the handle 44 and holding the tab 60, and thus the retainer disk 22, in place. When the retainer disk 22 is the position with the tab 60 aligned with the handle 44 and is held flush against the lip 40, the front extension 70 will be received within the sifter seat 56 in a friction fit, generally clicking into place. In embodiments including the two depressions 72 flanking the front extension 70, the depressions assist with insertion and removal of the extension 70 into and from the sifter seat 56, allowing the sifter assembly 16 to easily be snapped on and off the spreader 10.

The main body includes a central opening that serves as a selector disk seat 64, which optionally is surrounded by a radial array of notches 66. In the depicted embodiment the retainer disk 22 includes eight notches 66 arrayed about the central opening 64, but in other embodiments more or less notches may be employed or the notches 66 may even be eliminated altogether without departing from the scope of the invention. Again, the notches 66 serve as pin 26 retainment slots and thus rotation stops, which will become more apparent below. The retainer disk 22 also includes one or more (in the depicted embodiment two) pour openings 68. The pour openings 68 provide communication between an interior and exterior of the spreader 10 permitting granules or other particulate material to flow out of the spreader 10 when the spreader 10 is tipped. Finally, extending upwards from a periphery of the main body 58 are a plurality of hooks 62. The hooks 62 are configured to wrap around the outer perimeter of selector disk 20 and along with the selector disk seat 64 support the selector disk 20 in a rotatable manner, as will also become more apparent in connection with the discussion below.

Figure 8:
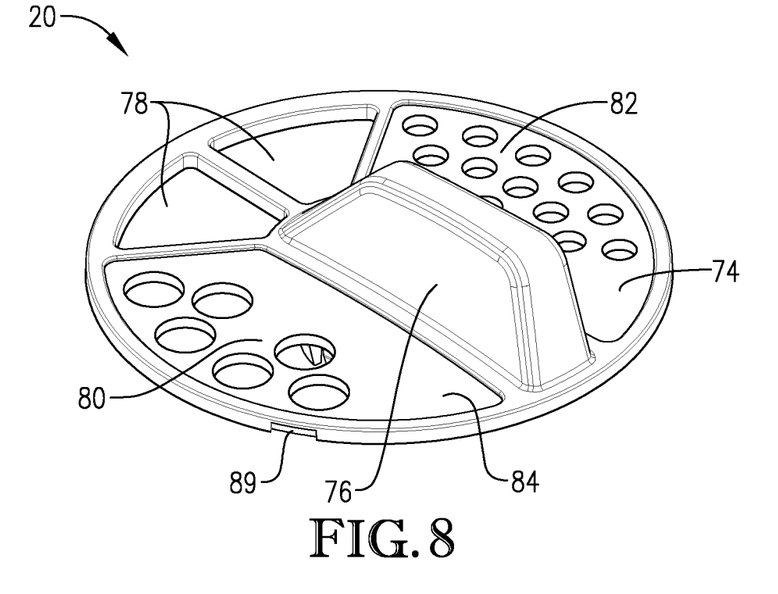
FIG. 8 is a top perspective view of a selection disk of the handheld spreader shown in FIGS. 1-2.
Figure 9:
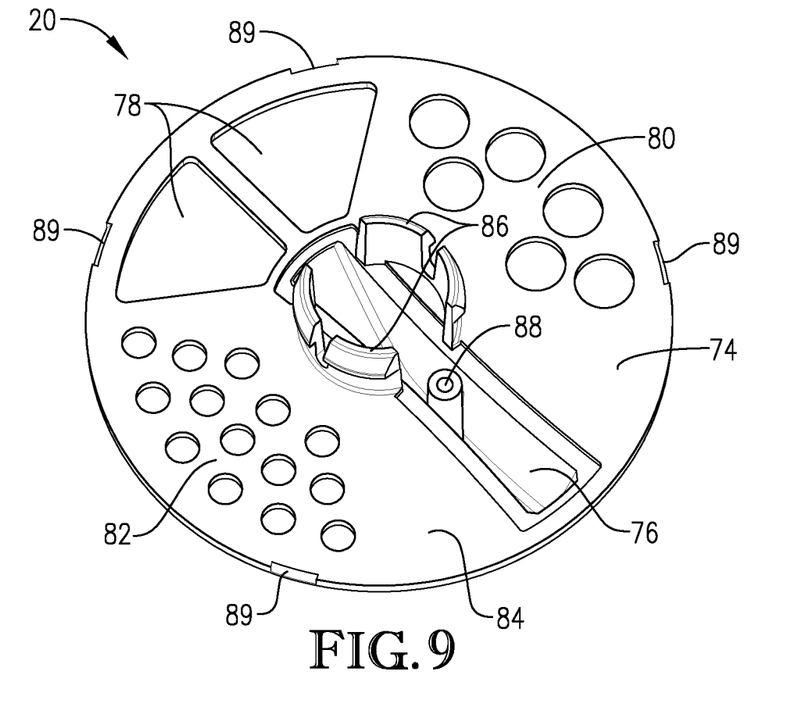
FIG. 9 is a bottom perspective view of the selection disk shown in FIG. 8.

The selector disk 20, which forms the second half of the sifter assembly 16, is shown in FIGS. 8 and 9. The selector disk 20 generally includes a substantially circular main body 74 with a thumb switch 76 extending upwards therefrom. The underneath side of the selector disk 20 generally includes one or more arcuate protrusions 86 sized and shaped to snap into the retainer disk 22 and more particularly within the selector disk seat 64 of the retainer disk 22. In some embodiments, the selector disk 20 may include one or more ramps 89, which are notches provided at the periphery of the selector disk 20 that assist with assembly of the selector disk 20 to the retainer disk 22 when assembling the sifter assembly 16. More particularly, in some embodiments the selector disk 20 may include a corresponding number of ramps 89 to the number of hooks 62 provided on the retainer disk 22, and during assembly the ramps 89 are aligned with the hooks 62 and as the disks 20, 22 are pushed towards one another each hook 62 slides along the respective inclined surface of a corresponding ramp 89 and deforms slightly outward before snapping back into place on the top side of the selector disk 20 and generally securing the selector disk 20 to the retainer disk 22. At the same time the generally arcuate protrusions 86 deform slightly inward as they are pressed through the selector disk seat 64 before snapping back into a rest state, further holding the selector disk 20 in a secure, but rotatably movable position, against the retainer disk 22. In this regard, because the ramps are provided on a bottom surface of the selector disk 20 and not the top, and because the distal ends of the protrusions 86 are ramped and thus easily slide into the selector disk seat 64 but not out therefrom, the assembly process is generally irreversible. That is, the selector disk 20 and retainer disk 22, once assembled in the manner described above, will not easily separate and thus are removed from the spreader 10 as a single assembly 16.

Moreover, once assembled as described above, the selector disk 20 is generally secured in a rotatable manner such that it selectively opens and closes the pour openings 68 provided in the retainer disk 22. More particularly, the selector disk 20 generally includes four sections of the main body 74: a first set of openings 78, a second set of openings 80, a third set of openings 82, and a closed portion 84. The first set of openings 78 substantially mirror the pour openings 68 such that when the selector disk 20 is rotated to a position in which the first set of openings 78 align with the pour openings 68, the handheld spreader 10 will have the highest flowrate of any of the sifter settings. Conversely, when the selector disk 20 is rotated to a position in which the closed portion 84 aligns with the pour openings 68, flow will be completely blocked off and thus no granules or particulate material will flow from the spreader 10 when it is inverted. As should be appreciated, the second and third set of openings 80, 82 will provide a flowrate in between that provided by the first set of openings 78 and the closed portion 84. Namely, when the second set of openings 80 are aligned with the pour openings 68 (FIG. 1), the flowrate will be less than when the first set of openings 78 are aligned with the pour openings but greater than when the third set of openings 82 or closed portion 84 are aligned with the pour openings 68. And when the third set of openings 82 are aligned with the pour openings 68, the flowrate will be less than when the first or second set of openings 78, 80 are aligned with the pour openings 68 but greater than when the closed portion 84 is aligned with the pour openings 68. In this regard, a user can selectively meter the flowrate of granules or other particulate material by rotating the selector disk 62 until the appropriate openings 78, 80, 82 are aligned with the pour openings 68 or else close the spreader to prevent inadvertent spillage, etc., by rotating the selector disk 62 until the closed portion 84 is aligned with the pour openings 68.

In some embodiments, a spring 24 and pin 26 are sandwiched between the selector disk 20 and the retainer disk 22 (FIG. 2). More particularly, as seen in FIG. 9, in some embodiments the selector disk 20 includes a boss 88 on the underneath side thereof—that is, the side of the selector disk 20 that faces the retainer disk 22 when in the assembled position forming the sifter assembly 16. The boss 88 includes a central bore configured to receive the spring 24 and pin 26. The pin 26 may include a shoulder or similar configured to press against the spring, such that when the spring 24 and pin 26 are placed with the boss 88 and the spring 24 is compressed (as the selector disk 20 and retainer disk 22 are sandwiched together to form the sifter assembly 16) the pin 24 is biased towards the retainer disk 22. The boss 88 (and thus the spring 24 and pin 26 therein) is located at a corresponding radial position as the plurality of notches 66 provided in the retainer disk 22, and a distal end of the pin 26 is sized and shaped to be received within the notches 66. In this regard, the pin 26 will click and lock into each subsequent notch 66 as the selector disk 20 is rotated with respect to the retainer disk 22. Thus, in the example where the retainer disk 22 includes eight notches 66 (FIGS. 2 and 6), there will be eight radial positions forming rotational stops where the selector disk 20 will click into place. These correspond to the four positions described above (that is, positions where the first set of openings 78, second set of openings 80, third set of openings 82, and the closed portion 84 are aligned with the pour openings 68) as well as four additional positions halfway between each of these positions. In this regard, the spring 24, pin 26, and notches 66 ensure that a chosen spreader setting will be maintained throughout application of granules or other particulate material notwithstanding a user shaking the spreader 10 during use.

Figure 10:
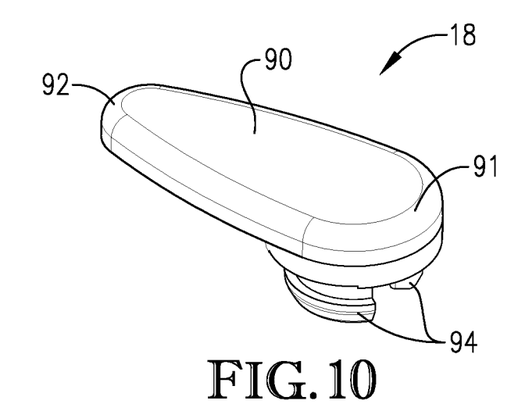
FIG. 10 is a top perspective view of a sifter latch of the handheld spreader shown in FIGS. 1-2.
Figure 11:
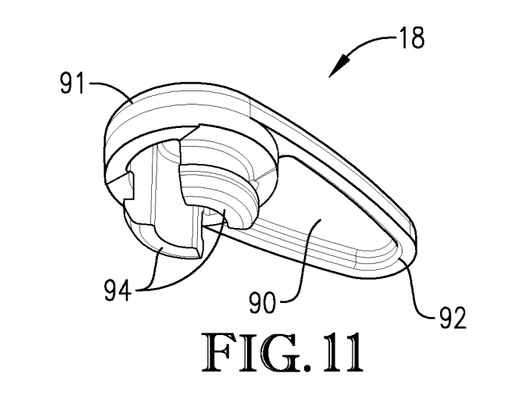
FIG. 11 is a bottom perspective view of the sifter latch shown in FIG. 10.

Finally, the sifter assembly 16 may further be secured to the scoop assembly 12 via the sifter latch 18, shown in FIGS. 10 and 11. The sifter latch 18 generally includes main body 90 that is oblong or egg shaped, including an elongated tail 92 extending from a wider base 91 of the main body 90. A pair of protrusions 94 extend downward from the base 91, which are received in the latch seat 46 of the scoop assembly 12 when the spreader 10 is in the assembled state (FIGS. 1, 12, and 13). The elongated tail 92 extends towards the scoop 36 of the scoop assembly 12 and overlaps, and thus secures, the tab 60 of the sifter assembly 16. During assembly, the sifter assembly 16 is secured to the scoop assembly 12 by inserting the extension 70 into the sifter seat 56, and then securing the tab 60 by overlapping the tab 60 with the elongated tail 92 and snapping the sifter latch 18 into place via the protrusions 94 being received within the latch seat 46. To remove the sifter assembly 16, the sifter latch 18 can either be completely removed by unsnapping the sifter latch 18 from the latch seat 46, or else the sifter latch 18 can be rotated such that the elongated tail 92 is rotated approximately ninety degrees (or more) from the position shown in FIG. 1 to the position shown in FIG. 12, which exposes the tab 60 allowing for the sifter assembly 16 to be lifted and removed.

In this regard, the sifter assembly 16 is easily removed and replaced on the handheld spreader 10 while leaving the scoop assembly 12 and other components in place. This may be best understood with reference to FIG. 12, which shows the spreader 10 with the sifter assembly 16 removed. Unlike known handheld spreaders, this beneficially allows the spreader 10 with scoop 36 still attached to be used with or without the sifter assembly 16. Notably, by simply removing the sifter assembly 16 as discussed above, the handheld spreader 10 can be easily filled with the desired granules or other particulate material without requiring the entire scoop assembly 12 to be unthreaded and removed. Beneficially, the attached scoop 36 can be used to scoop up granules or other particulate material when filling the spreader 10. Moreover, for applications where an increased flowrate of granules or other particulate material is desired (that is, one where the user does not wish to meter the flowrate using the sifter assembly 16), the sifter assembly 16 can be removed without requiring that the scoop assembly 12 (and thus the scoop 36 thereof) being removed, thus permitting the scoop 36 to still be used during application notwithstanding that the sifter assembly 16 has been removed. By allowing the sifter assembly 16 to be removed and replaced separate and apart from the scoop assembly 12 or other components of the handheld spreader 10, the spreader 10 exhibits increased ease of use, functionality, and flexibility as compared to known shaker-type spreaders.

In some embodiments, the handle 44 may be sized and shaped to assist with storage of the spreader 10. More particularly, the hook portion 52 of the handle 44 may be sized such that the handle 44 can easily surround, and thus the spreader 10 can hang from, a standard sized board 96 as shown in FIG. 13. The board 96 may be, in one non-limiting example, a dimensional lumber having a width of 1-½ inches (which is the width of nominal "2 by" boards including 2×2, 2×4, 2×6, etc., boards), and thus the hook portion 52 may extend far enough rearward such that the hand portion 50 of the handle 44 is separated from the cup 14 at least 1-½ inches. The handle 44 may be sized and shaped to accommodate any other sized board or similar without departing from the scope of the invention. Still more, in some embodiments the cup 14 may include a flat or truncated portion 98 configured to abut the board 96 when the spreader 10 is hanging therefrom, thereby providing increased stabilization when in the hanging position. Finally, in embodiments in which the handle 44 includes one or more through holes 48, the spreader can be secured to the board 96 or the like using a bungee, tie down, or similar.

To use the handheld spreader 10 to provide a metered flow of granules or other particulate material, a user first rotates the sifter latch 18 approximately ninety degrees (or more) from the position shown in FIG. 1 (i.e., to the position shown in FIG. 12), exposing the tab 60 of the sifter assembly 16. The user can then grasp the sifter assembly 16 and lift up, dislodging the sifter assembly 16 from the scoop assembly 12, and more particularly dislodging the extension 70 of the retainer disk 22 from the sifter seat 56 of the scoop assembly 12, and thus the sifter assembly 16 can be removed from the handheld spreader 10. Again, the selector disk 20 and retainer disk 22 will remain attached as a single assembly 16 when removed from the spreader 10. With the sifter assembly 16 removed, the open upper end 30 of the cup 14 is fully exposed, and the cup 14 can thus be filled with granules or other particulate material to be spread about a surface. For example, the granules or other particulate material can be poured into the open upper end 30 of the cup 14, or else the granules or other particulate material can be scooped into the open upper end 30 of the cup 14 using the scoop 36 that remains attached to the spreader 10.

Once the desired amount of granules or other particulate material is provided in the cup 14—which may optionally be determined using the tick marks 34 provided on the cup 14—the sifter assembly 16 is replaced (when a metered flow is desired) by inserting the extension 70 into the sifter seat 56 and placing the tab 60 on top of the handle 44, in between the pair of upstanding ears 45. The sifter latch 18 is then rotated back to the position shown in FIG. 1 from the position shown in FIG. 12, such that the elongated tail portion 92 abuts and covers the tab 60, holding the sifter assembly 16 in place. The user then selects an amount of metered flow by turning the selector disk 20 via the thumb switch 76 until the desired openings 78, 80, or 82 are aligned with the pour openings 68. Alternatively, the user can select a setting in between the desired openings 78, 80, or 82, as discussed, such that, for example, a first portion of the pour openings 68 are covered by one of the openings 78, 80, 82 or the closed portion 84 while a second portion of the pour openings 68 are covered by another one of the openings 78, 80, 82 or the closed portion 84.

The user then spreads the granules or other particulate material on a surface by inverting the spreader 10 and optionally agitating (i.e., shaking) the contents, causing the granules or other particulate material to flow through the pour openings 68, through the selected openings 78, 80, 82 of the selector disk 20, down the scoop 36 and more particularly down the serrations 37 of the inner surface of the scoop 36, and ultimately onto the surface. Optionally, once application of the granules or other particulate material is complete, the user can seal the pour openings 68 by rotating the selector disk 20 until the closed potion 84 is aligned with the pour openings 68, and then optionally store the spreader 10 by hanging it on a board 96 or similar as shown in FIG. 13.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense. Additional objects, advantages, and novel features of the invention will be set forth in part in the description which follows, and in part will become apparent to those skilled in the art upon examination of the following or may be learned by practice of the invention.

What is claimed is:

1. A handheld spreader comprising:
a cup configured to hold particulate material to be spread about a surface, the cup including an open upper end for dispersing the particulate material;
a scoop assembly removably coupled to the open upper end of the cup and including a seat, a handle, and a scoop, wherein the handle comprises a vertically extending hand portion and a horizontally extending hook portion, wherein the scoop is configured to direct particulate material being dispersed from the cup; and
a sifter assembly removably coupled to the seat of the scoop assembly and configured to meter an amount of the particulate material being dispersed from the cup when the sifter assembly is coupled to the scoop assembly;
a rotatable sifter latch positioned on the hook portion of the handle of the scoop assembly, wherein, when the sifter latch is in a first position with respect to the sifter assembly, the sifter latch secures the sifter assembly to the scoop assembly, and wherein, when the sifter latch is in a second position with respect to the sifter assembly different than the first position, the sifter assembly is configured to be removed from the scoop assembly, wherein, when the sifter assembly is removed from the scoop assembly, the scoop remains attached to the cup and is configured to direct particulate material being provided into the cup via the open upper end,
wherein the sifter assembly is generally circular and includes a tab extending from a periphery of the sifter assembly, wherein, when the sifter latch is in the first position, the sifter latch covers the tab of the sifter assembly, and wherein, when the sifter latch is in the second position, the sifter latch uncovers the tab of the sifter assembly,
wherein the tab of the sifter assembly is aligned with the hook portion of the handle of the scoop assembly when the sifter assembly is coupled to the scoop assembly.

2. The handheld spreader of claim 1, wherein the scoop assembly includes a latch seat, and wherein the rotatable sifter latch is rotatably coupled to the latch seat.

3. The handheld spreader of claim 1, wherein the sifter assembly includes a retainer disk and a selector disk rotatably coupled to the retainer disk, wherein the retainer disk includes at least one pour opening, and wherein the selector disk is configured to selectively open or close the at least one pour opening.

4. The handheld spreader of claim 3, wherein the sifter assembly includes a spring and a pin disposed in a boss of the selector disk, and wherein the retainer disk includes a plurality of notches configured to receive a distal end of the pin as the selector disk rotates with respect to the retainer disk.

5. The handheld spreader of claim 3, wherein the selector disk includes a plurality of sets of openings, wherein each of the plurality of sets of openings is configured to provide a corresponding flowrate of particulate material when the respective set of openings is aligned with the at least one pour opening, and wherein a first flowrate provided by a first set of openings is different from a second flowrate provided by a second set of openings.

6. The handheld spreader of claim 1, wherein the scoop includes a plurality of serrations configured to guide the particulate material being dispersed from the cup.

7. A dual configuration handheld spreader comprising:
a cup configured to hold particulate material to be spread about a surface, the cup including an open upper end for dispersing the particulate material;
a scoop assembly removably coupled to the open upper end of the cup and including a seat, a handle, and a scoop, wherein the handle comprises a vertically extending hand portion and a horizontally extending hook portion;
a sifter assembly removably coupled to the seat of the scoop assembly; and
a rotatable sifter latch positioned on the hook portion of the handle of the scoop assembly, wherein, when the sifter latch is in a first position with respect to the sifter assembly, the sifter latch secures the sifter assembly to the scoop assembly, and wherein, when the sifter latch is in a second position with respect to the sifter assembly different than the first position, the sifter assembly is configured to be removed from the scoop assembly, wherein, when the sifter assembly is removed from the scoop assembly, the scoop remains attached to the cup, wherein the sifter assembly is generally circular and includes a tab extending from a periphery of the sifter assembly, wherein, when the sifter latch is in the first position, the sifter latch covers the tab of the sifter assembly, and wherein, when the sifter latch is in the second position, the sifter latch uncovers the tab of the sifter assembly, wherein the tab of the sifter assembly is aligned with the hook portion of the handle of the scoop assembly when the sifter assembly is coupled to the scoop assembly, wherein, when the handheld spreader is in a first configuration, the sifter assembly is coupled to the seat of the scoop assembly and is configured to meter an amount of the particulate material being dispersed from the cup and the scoop is configured direct particulate material being dispersed from the cup, and wherein, when the handheld spreader is in a second configuration, the sifter assembly is removed from the scoop assembly and the scoop is configured direct particulate material into the cup.

8. The dual configuration handheld spreader of claim 7, wherein the sifter latch secures the sifter assembly to the handheld spreader when the handheld spreader is in the first configuration, and wherein the sifter latch is configured to rotate such that the sifter assembly is removed from the handheld spreader when the handheld spreader is in the second configuration.

9. The dual configuration handheld spreader of claim 8, wherein the scoop assembly includes a latch seat, and wherein the rotatable sifter latch is rotatably coupled to the latch seat.

10. The dual configuration handheld spreader of claim 7, wherein the sifter assembly includes a retainer disk and a selector disk rotatably coupled to the retainer disk, wherein the retainer disk includes at least one pour opening, and wherein the selector disk is configured to selectively open or close the at least one pour opening when the handheld spreader is in the first configuration.

11. The dual configuration handheld spreader of claim 10, wherein the sifter assembly includes a spring and a pin disposed in a boss of the selector disk, and wherein the retainer disk includes a plurality of notches configured to receive a distal end of the pin as the selector disk rotates with respect to the retainer disk when the handheld spreader is in the first configuration.

12. The dual configuration handheld spreader of claim 10, wherein the selector disk includes a plurality of sets of openings, wherein each of the plurality of sets of openings is configured to provide a corresponding flowrate of particulate material when the respective set of openings is aligned with the at least one pour opening when the handheld spreader is in the first configuration, and wherein a first flowrate provided by a first set of openings is different from a second flowrate provided by a second set of openings.

13. The dual configuration handheld spreader of claim 7, wherein the scoop includes a plurality of serrations, wherein the plurality of serrations are configured to guide the particulate material being dispersed from the cup when the handheld spreader is in the first configuration, and wherein the plurality of serrations are configured to guide the particulate material into the cup when the handheld spreader is in the second configuration.

14. A handheld spreader comprising:
an open-ended cup configured to hold particulate material to be spread about a surface;
a scoop assembly removably coupled to the cup and including a seat, a handle, and a scoop, wherein the handle comprises a vertically extending hand portion and a horizontally extending hook portion;
a sifter assembly removably coupled to the seat of the scoop assembly and configured to meter an amount of the particulate material being dispersed from the cup when the sifter assembly is coupled to the scoop assembly; and
a rotatable sifter latch positioned on the hook portion of the handle of the scoop assembly, wherein, when the sifter latch is in a first position with respect to the sifter assembly, the sifter latch secures the sifter assembly to the scoop assembly, and wherein, when the sifter latch is in a second position with respect to the sifter assembly different than the first position, the sifter assembly is configured to be removed from the scoop assembly, wherein, when the sifter assembly is removed from the scoop assembly, the scoop remains attached to the cup and is configured to direct particulate material into the cup via the open end of the cup, wherein the sifter assembly is generally circular and includes a tab extending from a periphery of the sifter assembly, wherein, when the sifter latch is in the first position, the sifter latch covers the tab of the sifter assembly, and wherein, when the sifter latch is in the second position, the sifter latch uncovers the tab of the sifter assembly, wherein the tab of the sifter assembly is aligned with the hook portion of the handle of the scoop assembly when the sifter assembly is coupled to the scoop assembly.

* * * * *